United States Patent
Johansen et al.

(10) Patent No.: US 10,286,360 B2
(45) Date of Patent: May 14, 2019

(54) METHOD FOR CLEANING PROCESS OFF- OR ENGINE EXHAUST GAS

(71) Applicants: Haldor Topsøe A/S, Kgs. Lyngby (DK); Ecospray Technologies S.r.l., Alzano Scrivia (IT)

(72) Inventors: Keld Johansen, Frederikssund (DK); Maurizio Archetti, Verscio (CH)

(73) Assignees: Haldor Topsoe A/S, Lyngby (DE); Ecospray Technologies S.r.l., Alzano Scrivia (IT)

( * ) Notice: Subject to any disclaimer, the term of this patent is extended or adjusted under 35 U.S.C. 154(b) by 86 days.

(21) Appl. No.: 15/500,579

(22) PCT Filed: Feb. 23, 2015

(86) PCT No.: PCT/EP2015/053698
§ 371 (c)(1),
(2) Date: Jan. 31, 2017

(87) PCT Pub. No.: WO2016/030025
PCT Pub. Date: Mar. 3, 2016

(65) Prior Publication Data
US 2017/0216771 A1 Aug. 3, 2017

(30) Foreign Application Priority Data
Aug. 25, 2014 (WO) .................. PCT/EP2014/067985

(51) Int. Cl.
| | | |
|---|---|---|
| *B01D 53/94* | (2006.01) | |
| *F01N 13/00* | (2010.01) | |
| *B01D 46/00* | (2006.01) | |
| *F01N 3/04* | (2006.01) | |
| *F01N 3/10* | (2006.01) | |
| *F01N 3/20* | (2006.01) | |
| *F01N 5/04* | (2006.01) | |
| *F01N 9/00* | (2006.01) | |
| *F01N 13/08* | (2010.01) | |
| *F01N 3/023* | (2006.01) | |
| *F01N 3/032* | (2006.01) | |
| *F01N 3/035* | (2006.01) | |
| *B01D 53/50* | (2006.01) | |
| *B01J 23/652* | (2006.01) | |
| *B01J 35/00* | (2006.01) | |
| *B01J 35/04* | (2006.01) | |

(Continued)

(52) U.S. Cl.
CPC ..... *B01D 53/9459* (2013.01); *B01D 46/0061* (2013.01); *B01D 46/0068* (2013.01); *B01D 53/501* (2013.01); *B01D 53/944* (2013.01); *B01D 53/9409* (2013.01); *B01D 53/9418* (2013.01); *B01D 53/9477* (2013.01); *B01J 21/063* (2013.01); *B01J 23/22* (2013.01); *B01J 23/30* (2013.01); *B01J 23/44* (2013.01); *B01J 23/6527* (2013.01); *B01J 35/0006* (2013.01); *B01J 35/04* (2013.01); *F01N 3/0232* (2013.01); *F01N 3/0233* (2013.01); *F01N 3/032* (2013.01); *F01N 3/035* (2013.01); *F01N 3/04* (2013.01); *F01N 3/106* (2013.01); *F01N 3/2066* (2013.01); *F01N 5/04* (2013.01); *F01N 9/002* (2013.01); *F01N 13/009* (2014.06); *F01N 13/0093* (2014.06); *F01N 13/017* (2014.06); *F01N 13/087* (2013.01); *B01D 53/9495* (2013.01); *B01D 2251/2067* (2013.01); *B01D 2251/304* (2013.01); *B01D 2251/604* (2013.01); *B01D 2252/10* (2013.01); *B01D 2252/1035* (2013.01); *B01D 2255/1023* (2013.01); *B01D 2255/20707* (2013.01); *B01D 2255/20723* (2013.01); *B01D 2255/20776* (2013.01); *B01D 2255/9155* (2013.01); *B01D 2257/302* (2013.01); *B01D 2257/404* (2013.01); *B01D 2257/60* (2013.01); *B01D 2257/702* (2013.01); *B01D 2258/01* (2013.01); *B01D 2273/20* (2013.01); *F01N 2340/06* (2013.01); *F01N 2370/02* (2013.01); *F01N 2410/04* (2013.01); *F01N 2550/12* (2013.01); *F01N 2550/14* (2013.01); *F01N 2570/04* (2013.01); *F01N 2590/02* (2013.01); *F01N 2590/08* (2013.01); *Y02T 10/16* (2013.01); *Y02T 10/47* (2013.01)

(58) Field of Classification Search
CPC ............. B01D 53/9459; B01D 53/501; B01D 53/9409; B01D 53/9418; B01D 53/944; B01D 46/0061; B01D 46/0068; F01N 13/009; F01N 13/017; F01N 13/0093; F01N 3/032; F01N 3/035; F01N 3/04; F01N 3/106; F01N 3/2066; F01N 9/00; F01N 9/002; B01J 21/063; B01J 23/22; B01J 23/30; B01J 23/44; B01J 23/6527
USPC ........................................................ 60/274
See application file for complete search history.

(56) References Cited

U.S. PATENT DOCUMENTS

| | | | | |
|---|---|---|---|---|
| 5,390,492 A | * | 2/1995 | Levendis | ................ F01N 3/023 55/302 |
| 6,644,022 B2 | | 11/2003 | Hirota et al. | |

(Continued)

FOREIGN PATENT DOCUMENTS

| | | |
|---|---|---|
| CN | 2459443 Y | 11/2001 |
| CN | 1365425 A | 8/2002 |

(Continued)

*Primary Examiner* — Audrey K Bradley
*Assistant Examiner* — Kelsey L Stanek
(74) *Attorney, Agent, or Firm* — Blank Rome LLP

(57) ABSTRACT

Method for removal of soot, ash and metals or metal compounds, together with removal of NOx and SOx being present in process off-gasses or engine exhaust gasses.

9 Claims, No Drawings

(51) Int. Cl.
  *B01J 21/06*   (2006.01)
  *B01J 23/22*   (2006.01)
  *B01J 23/30*   (2006.01)
  *B01J 23/44*   (2006.01)

(56) References Cited

U.S. PATENT DOCUMENTS

| | | | |
|---|---|---|---|
| 7,273,514 B2 | 9/2007 | Bailey et al. | |
| 8,096,125 B2 | 1/2012 | Hepburn et al. | |
| 2006/0144223 A1* | 7/2006 | Sellers | B01D 46/0064 95/1 |
| 2009/0178407 A1 | 7/2009 | Joergl et al. | |
| 2010/0224062 A1* | 9/2010 | Patterson | B01D 53/1481 95/158 |
| 2010/0307339 A1* | 12/2010 | Tadrous | B01D 46/0063 95/280 |
| 2013/0118162 A1* | 5/2013 | Hepburn | F01N 3/021 60/602 |
| 2015/0128576 A1* | 5/2015 | Osumi | F01N 3/035 60/287 |

FOREIGN PATENT DOCUMENTS

| | | | | |
|---|---|---|---|---|
| CN | 1693682 A | 11/2005 | | |
| CN | 101479447 A | 7/2009 | | |
| CN | 201908706 U | 7/2011 | | |
| CN | 202181956 U | 4/2012 | | |
| EP | 2 042 227 A2 | 4/2009 | | |
| JP | H04-339119 A | 11/1992 | | |
| JP | 2004-285881 A | 10/2004 | | |
| WO | WO 99/10633 A1 | 3/1999 | | |
| WO | WO 2012/041455 A1 | 4/2012 | | |
| WO | WO 2012041455 A1 * | 4/2012 | | F01N 3/0233 |
| WO | WO 2013/127473 A1 | 9/2013 | | |
| WO | WO 2013/179266 A1 | 12/2013 | | |
| WO | WO 2013179266 A1 * | 12/2013 | | F01N 3/0232 |

\* cited by examiner

METHOD FOR CLEANING PROCESS OFF- OR ENGINE EXHAUST GAS

The present invention relates to a method for the removal of particulate matter in form ash, soot, heavy metals, metals and metal compounds and nitrogen oxides (NOx) being present in process off-gas or engine exhaust gas. In particular the invention is useful for the removal of these components from process off-gasses from the production of cement or glass and exhaust gas of engines operated on heavy fuel oil.

These particle-containing gasses very often contain a plurality of pollutants, e.g. $NO_x$, volatile organic compounds (VOC), $SO_2$, CO, Hg, $NH_3$, polyaromatic hydrocarbons (PAH's), dioxins and furans, in concentrations that have to be reduced depending on local legislation. For this purpose, several conventional methods are available.

Soot and ash are typically captured and removed by passing the gas through one or more filters arranged in the exhaust or vent system. After a certain time on stream the captured amounts of soot and ash cause an increasing pressure drop over the filters and the filters need to be regenerated by burning off the soot and blowing off the ash and other inorganic particulate matter with compressed air or by a manual process.

The known particulate filter systems are developed for off and exhaust gasses with a relatively low content of sulphur compounds and particulate matter. These systems can not be employed for e.g. maritime engines fuelled with heavy fuel oil, the so called bunker oil and process off-gas with a high content of particulate matter e.g. from the production of cement and glass.

Bunker oil contains very heavy hydrocarbons and polyaromatic compounds. The oil is heavily contaminated with compounds, which do not burn and end as ash in the exhaust. Further contaminants contained in bunker oil include not only water soluble metal salts sodium (Na), potassium (K), calcium (Ca), iron (Fe), metal sulfates ($MeSO_4$), and several others, but also the oil soluble metals vanadium (V), lead (Pb), nickel (Ni) and others.

The abatement of gaseous contaminants like $NO_x$, VOC, PAH's, dioxins and furans can be effectively carried out by contact with a catalyst. In particular, vanadium oxide-based catalysts are commonly used catalysts for $NO_R$ reduction by selective reduction of $NO_x$ with $NH_3$ in stationary and automotive applications.

The general object of the invention is to provide a method for the abatement of particulate matter in form of ash and soot together with removal of NOx and VOC from off- or exhaust gas, which method ensures an effectively cleaning and a continuous operation, even when a particulate filter employed in the method needs to be regenerated.

As discussed above, particulate matter in off-gases from processes and engine exhaust gasses contain further inorganic ash that cannot be combusted and therefore will accumutate in the filter over time and build up a pressure drop. Consequently, the inorganic ash and remaining amounts of soot must be removed by periodical reversing the flow direction of the exhaust gas through the filter or blowing off the ash and soot by impulsed injection of air.

Essential features of the invention are a continuous removal of gaseous impurities together with passive soot regeneration of particulate filters by catalysing the filters with a catalyst being active in the selective catalytic reduction (SCR) of NOx and which at the time accelerates soot combustion and VOC oxidation, thereby improving the filtration process by keeping the pressure drop over the particulate filters low and by periodically and effectively blowing off of particulate matter by pulse injection of air into outlet of the filters.

In summary, the invention provides a method for the removal of particulate matter in form of soot, ash, metals and metal compounds, together with hydrocarbons and nitrogen oxides being present in process off-gas or engine exhaust gas, comprising the steps of providing a process off-gas or engine exhaust gas containing a nitrogenous reductant or adding the nitrogenous reductant to the off- or exhaust gas;

passing the off-gas or the exhaust gas at a gas temperature of 225° C. to 550° C. through at least one filter unit each comprising at least one particulate filter and capturing the particulate matter;

reducing amounts of soot captured on the at least one particulate filter and reducing amounts of nitrogen oxides and hydrocarbons in the off- or exhaust gas by selective catalytic reduction (SCR) with the nitrogenous reductant and by oxidation in contact with a combined SCR and oxidation catalyst being arranged in the particulate filter;

periodically disconnecting the at least one filter unit from flow of the off- or exhaust gas;

applying a pneumatic pulse at the outlet of the at least one particulate filter by pulse injecting air into the outlet in reverse to the previous flow of the exhaust gas and blowing off the captured particulate matter together with the heavy metals from the at least one particulate filter, applying suction at inlet of the at least one particulate filter, and conveying the blown off particulate matter and heavy metals from the at least one particulate filter, optionally through an external auxiliary filter unit, to a container, wherein the combined SCR and oxidation catalyst consists of titanium dioxide, oxides of vanadium and tungsten.

Preferred embodiments are disclosed in the following. These embodiments can either be employed each alone or in combination thereof.

The particulate filters for use in the invention are preferably made from silicon carbide, cordierite, mullite, aluminium titanate or sintered metal.

Typically, the filters for use in the invention are shaped as wall flow filters, which ensure the highest cleaning efficiency, but other filter types may be employed.

The catalyst is coated on and/or inside the filter walls.

The catalytically active material is a catalyst composition consisting of a vanadium oxide, tungsten oxide and titania, in the following called "the V/W/Ti catalyst".

The term "a vanadium oxide" or "vanadium oxide" refers to vanadium(II)oxide (vanadium monoxide), VO; or
vanadium(III)oxide (vanadium sesquioxide or trioxide), $V_2O_3$; or
vanadium(IV)oxide (vanadium dioxide), $VO_2$; or
vanadium(V)oxide (vanadium pentoxide), $V_2O_5$.

Preferably, vanadium oxide for use in the invention comprises or consists of vanadium(V)oxide (vanadium pentoxide), $V_2O_5$.

Tungsten has several oxidation states, and therefore oxides:
Tungsten(III) oxide
Tungsten(IV) oxide
Tungsten(VI) oxide
Tungsten pentoxide.

A preferred tungsten oxide for use in the invention comprises or consists of Tungsten (VI) oxide $WO_3$.

The term "titania" refers to titanium dioxide ($TiO_2$).

This catalyst is active both in the removal of hydrocarbons (VOC) and in the removal of NOx by the SCR reaction with NH3.

In further an embodiment the V/W/Ti SCR catalyst is coated on the gas inlet side and within the walls of a wall flow filter, while a further catalyst composition consisting of vanadium oxide and palladium in metallic and/or oxidic form and titania or vanadium oxide, tungsten oxide and palladium in metallic and/or oxidic form and titania is coated at the gas outlet side of the wall flow filter.

The advantage of providing the outlet side of the filter with a V/W/Ti/Pd or a V/Ti/Pd catalyst is a lower slip of ammonia and carbon monoxide from the filter.

As mentioned above a further essential feature of invention is removal of trapped particulate matter formed during combustion of the heavy fuel oil. The particulate filters must be cleaned periodically by shutting off the filters from exhaust gas flow.

Preferably, the off- or exhaust gas is passed through more than one filter units. All filter units can then be cleaned in a cyclic cleaning loop by the method according to the invention as described in more detail in the following. The engine can remain in continuous operation because at least one filter unit remains in filtration mode.

During cleaning of the particulate filters, air is injected in reverse to the previous flow of the exhaust gas at an injection pulse duration of between 10 and 600 msec, preferably 300 msec.

In the cleaning cycle, a particulate filter or a section of a filter unit (5-50% of the entire filtering surface) can be closed at the outlet and the air is injected into the outlet by a valve or nozzle e.g. mounted on or near a closing valve. Thereby blowing off particulate matter comprising ash, uncombusted soot and heavy metals, metals, metal compounds trapped in the particulate filter is even more efficiently because of the lower volume the air pulse injected into the particulate filter compared to a manner, where the outlet is open. In the latter case, the air pulse propagates throughout the whole filter unit encasing the particulate filter/s and thus limit cleaning effect.

Alternatively, the outlet of each particulate filter can be open during the cleaning cycle using a more powerful air injection pulse. The advantage of this embodiment is simplicity and a more compact filter arrangement.

During the pneumatic injection pulse into the particulate filter to be cleaned, a cleaning air stream with high concentration of particulate matter exits from the inlet side of the particulate filter and the air stream is captured by a proper suction system. The air stream containing the blown off particulate matter is then conveyed away from the inlet of the particulate filter through a suction pipe, optionally provided with a perforated grid installed at or close to the inlet of the particulate filter. The suction pipe is connected to a suction source e.g. a suction pump, which is activated during or after the air pulse is injected into outlet of the particulate filter.

The particulate matter may be sucked in the suction pipe through an external auxiliary low temperature filter or an auxiliary high temperature filter or both, optionally catalysed with a soot combustion catalyst as described above. Thereby, particulate matter removed from the main particulate filters and contained in the cleaning air stream is separated from the stream in the auxiliary filter/s and then discharged into a storage container for future disposal.

The suction source can be made alternatively by an external suction pump provided with a small auxiliary filter. The auxiliary filter collects the particle carried in the air stream in the suction gas flow line.

Alternatively the suction stream can be also created by utilizing the pressure drop across the particulate filter/s. In this embodiment the suction pipe connects the exhaust gas inlet side of the filter unit/s or the particulate filter/s with the exhaust gas outlet side from the filter unit/s or the particulate filter/s and the particulate matter blown off the particulate filter/s is sucked through an auxiliary filter installed in the suction pipe. When the cleaning cycle is in pause, captured particulate matter can be removed from the auxiliary filter.

The pressure applied in the suction pipe must be low enough to ensure an efficient transport of particulate matter in the suction pipe.

Preferably the pressure in the suction pipe is in the range of 30-300 mbar below the pressure inside the particulate filters.

In further an embodiment of the invention, the air for pulse injection is withdrawn from an accumulator tank with compressed air at a pressure 4 to 10 bar abs, preferably 6.5 bar abs.

In still an embodiment, the unit/s are arranged in a pressure vessel upstream an engine turbocharger. The exhaust gas may then be passed through the filter unit/s at a pressure of between 0 and 3 bar abs.

The soot combustion temperature can in this embodiment be kept at a more optimal level about 400° C. without additional exhaust gas heating. As further an advantage, pressure drop over the particulate filter(s) is decreased when increasing the pressure of the exhaust gas and the temperature. This results advantageously in a diminished particulate filter volume required for effective filtration and facilitates e.g. retrofit installation on ships with limited space for exhaust gas treatment.

A further feature of the invention as disclosed above is the possibility to remove sulphur oxides being formed in process off-gasses and when burning heavy fuel oil in an engine. The upstream SCR and oxidation catalyst in the filters is resistant to sulphur compounds and has a limited $SO_2$ to $SO_3$ oxidation potential that therefore facilitates use of a SOX scrubber for $SO_2$ and $SO_3$ removal.

Thus, in a further embodiment the method comprises the additional step of reducing amounts of sulphur oxides contained in the gas by scrubbing the gas in an open or closed loop, downstream of the at least one filter unit with a scrubbing liquid comprising an aqueous alkaline solution or an alkaline solution in sea water. In the alkaline scrubbing liquid the sulphur oxides are converted to harmless alkaline metal sulphates or sulphites. The sulphur oxides are thereby almost completely removed from the off gases without any sulphuric acid mist and a clear low turbidity spent solution is stored for later disposal.

The invention claimed is:

1. A method for the removal of particulate matter in the form of soot, ash, metals and metal compounds, together with hydrocarbons and nitrogen oxides being present in process off-gas or engine exhaust gas, comprising the steps of:

providing a process off-gas or engine exhaust gas containing a nitrogenous reductant or adding the nitrogenous reductant to the off- or exhaust gas;

passing the off-gas or the exhaust gas at a gas temperature of 225° C. to 550° C. through at least one filter unit each comprising at least one particulate filter and capturing the particulate matter;

reducing amounts of soot captured on the at least one particulate filter and reducing amounts of nitrogen oxides and hydrocarbons in the off- or exhaust gas by selective catalytic reduction (SCR) with the nitrogenous reductant and by oxidation in contact with at least a first combined SCR and oxidation catalyst being coated on or inside walls at a gas inlet side of the particulate filter;

periodically disconnecting the at least one filter unit from flow of the off- or exhaust gas;

applying a pneumatic pulse at an outlet of the at least one particulate filter by pulse injecting air into the outlet in reverse to the previous flow of the exhaust gas and blowing off the captured particulate matter together with the heavy metals and metal compounds from the at least one particulate filter; and applying suction at the gas inlet side of the at least one particulate filter, and conveying the blown off particulate matter and heavy metals and metal compounds from the at least one particulate filter, optionally through an external auxiliary filter unit, to a container, wherein the at least first combined SCR and oxidation catalyst consists of titanium dioxide, oxides of vanadium and oxides of tungsten, and wherein a second oxidation catalyst is coated at a gas outlet side of the particulate filter, consisting of vanadium oxide and palladium in at least one of metallic form and oxide form, and titania, or consisting of vanadium oxide, tungsten oxide and palladium in at least one of metallic form and oxide form, and titania.

2. The method of claim 1, wherein the at least one particulate filter is in form of a wall flow filter.

3. The method of claim 1, wherein a body of the at least one particulate filter is prepared from silicon carbide, cordierite, mullite, aluminium titanate or sintered metal.

4. The method of claim 1, wherein the air is pulse injected with an injection pulse duration of between 10 and 600 msec.

5. The method of claim 1, wherein the air for pulse injection is withdrawn from an accumulator tank with compressed air at a pressure of 4 to 10 bar abs.

6. The method of claim 1, wherein the at least one filter unit is arranged in a pressure vessel upstream an engine turbocharger.

7. The method of claim 1, wherein the exhaust gas is passed through the at least one filter unit at a pressure of between 0 and 3 bar abs.

8. The method according to claim 1, comprising the further step of an additional selective catalytic reduction of nitrogen oxides in the off- or exhaust gas downstream of the at least one filter unit.

9. The method according to claim 1, comprising the further step of reducing amounts of sulphur oxides contained in the exhaust gas by scrubbing the gas with an alkaline solution or water in an open or closed loop, downstream of the at least one filter unit.

* * * * *